June 24, 1958  C. S. JONES  2,840,226
AUTOMATIC CONTROL GATE ACTUATING MECHANISM FOR
UNDERBUNKER COAL CONVEYOR SYSTEMS AND THE LIKE
Filed Jan. 9, 1957  2 Sheets-Sheet 1
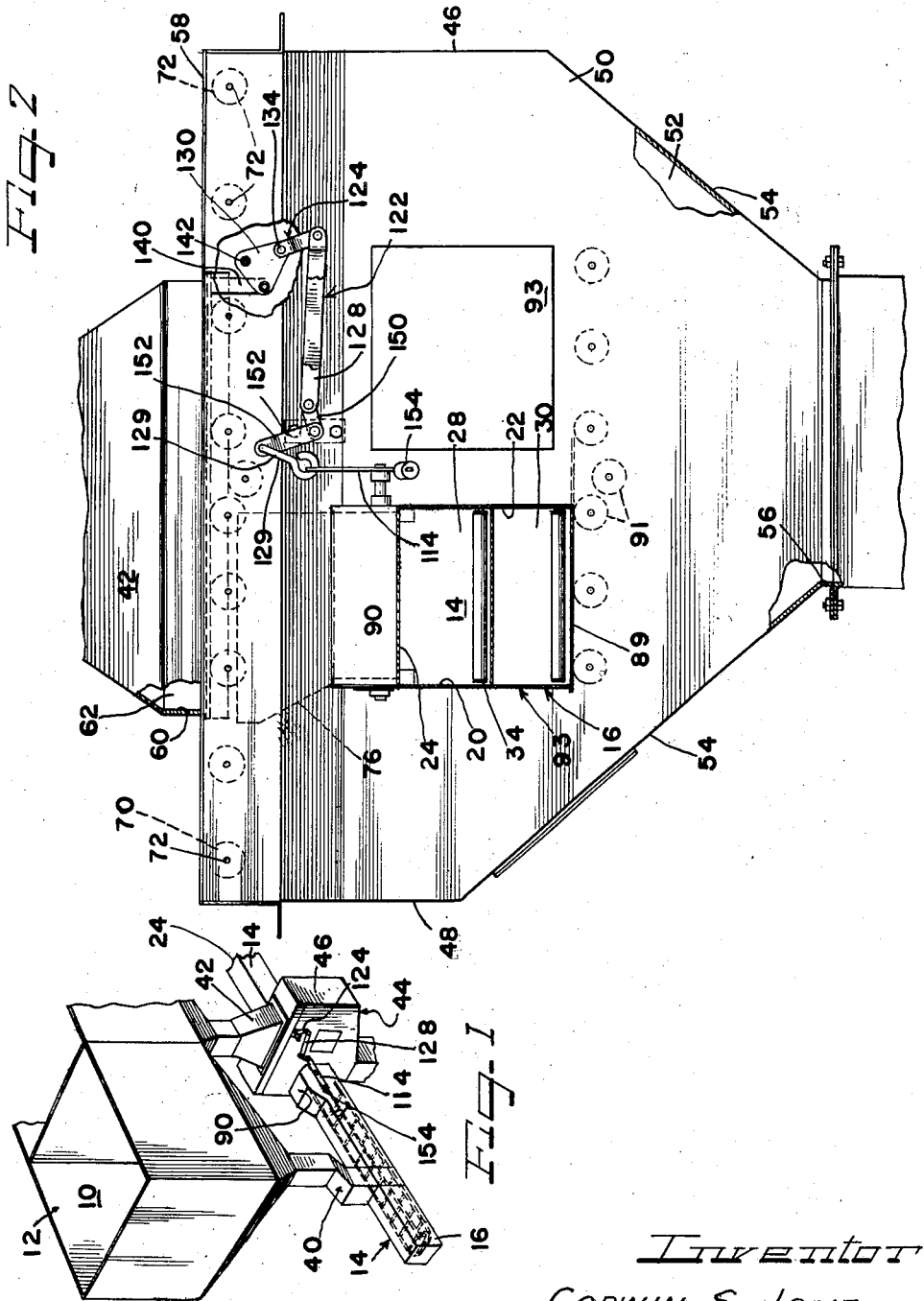
Inventor
CORWIN S. JONES
By: Fred Gerlach
his Atty

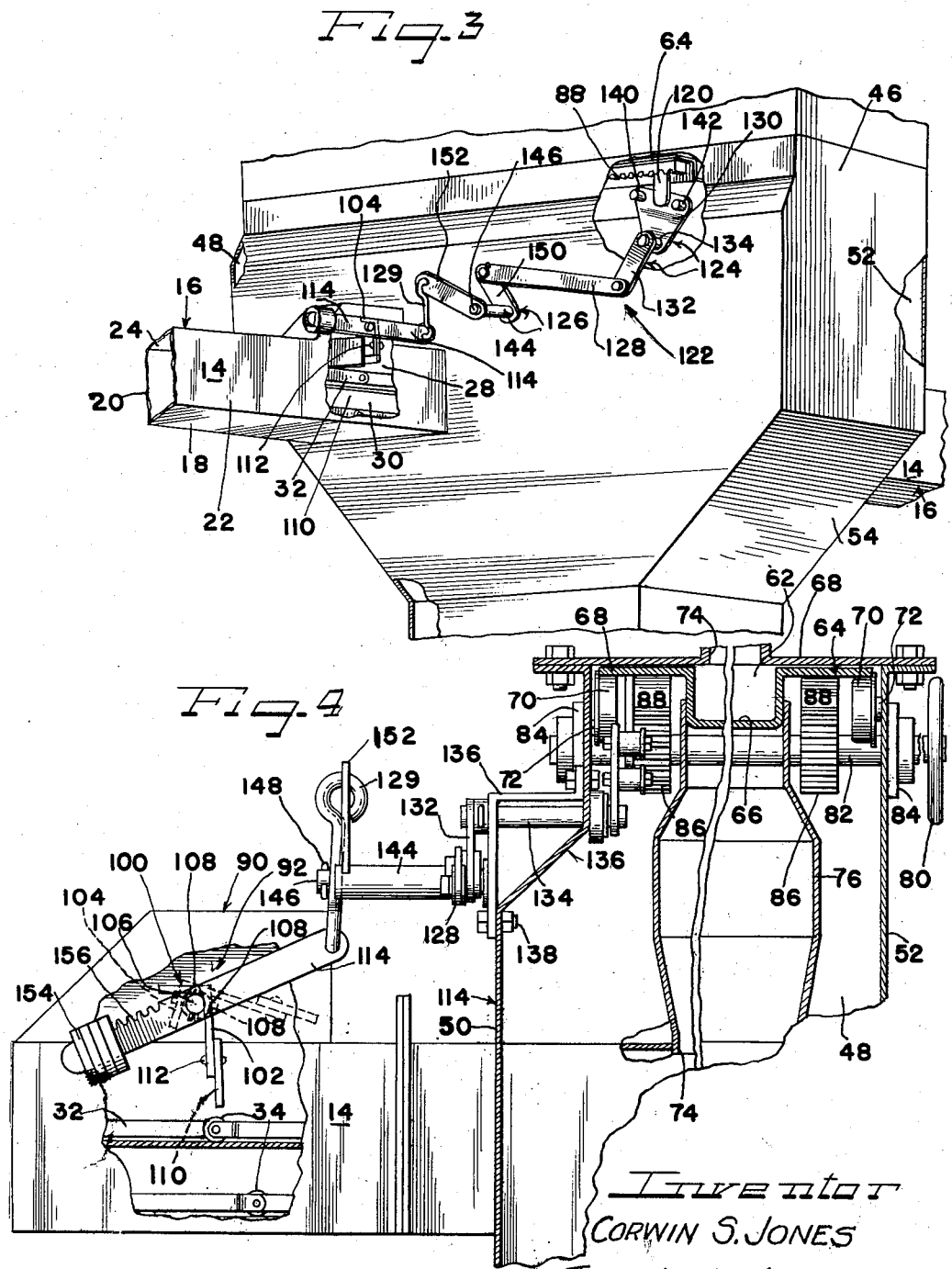

United States Patent Office

2,840,226
Patented June 24, 1958

2,840,226

AUTOMATIC CONTROL GATE ACTUATING MECHANISM FOR UNDERBUNKER COAL CONVEYOR SYSTEMS AND THE LIKE

Corwin S. Jones, Tiffin, Ohio, assignor to Webster Manufacturing, Inc., Tiffin, Ohio, a corporation of Ohio Application January 9, 1957, Serial No. 633,309

5 Claims. (Cl. 198—54)

The present invention relates to underbunker coal conveyor systems and more particularly to an automatic actuating mechanism for the control gates ordinarily associated with such systems.

Systems of the character with which the present actuating mechanism is concerned involve in their general organization an overhead bunker of large capacity, the bunker being divided into a series of individual bins, the bins being arranged in alignment and extending in a row throughout the entire length of the bunker floor. The bins are open at their top and may selectively be fed by the usual overbunker conveyor. Beneath the bunker floor and likewise extending the full length thereof is an underbunker conveyor which is adapted to selectively receive material from the various bins above and which, accordingly, communicates with the various bunker or bin outlets through the medium of a series of gravity chutes, each discharging into a so-called three-way hopper which has associated therewith plural gate devices which may be selectively operated, first to discharge coal directly into the conveyor from the bin above, secondly, to by-pass the coal around the conveyor and discharge the same for consumption at some remote point, as for example to a weighing scale preparatory to being fed to a stoker for the operation of a boiler or the like, or thirdly, to discharge the contents of the conveyor issuing from a remote point in the conveyor system, for example, from another bin in the series, directly into the hopper for subsequent discharge thereby to the scene of boiler operation. By such an arrangement is possible by selective operation of the gate devices associated with the various hoppers to withdraw coal from any desired portion of the bunker for use at various boiler locations, or for other disposition thereof as desired, and even for transfer from one bunker bin to another bin, utilizing suitable elevator mechanism for this purpose.

One of the gate structures associated with each hopper is in the form of a two-way or dual-acting gate capable of reciprocable movement to selectively uncover either of two discharge openings in the chute bottom leading from the bunker, one opening discharging directly into the upper run of the conveyor which passes transversely through the hopper, and the other opening discharging at a region laterally displaced from the conveyor so as to by-pass the latter and cause the material entering the hopper to be discharged from the hopper bottom without entering the conveyor. The other gate structure is of the single-acting type and is associated with a discharge opening leading from the lower run of the conveyor so that material may be taken from the latter and discharged into the hopper and, in turn, discharged therefrom for use at the boiler installation. Underbunker conveyors of the type outlined herein are usually covered and, in order to prevent piling up of the coal in the upper run of the same and consequent "flooding" of the conveyor under the influence of the static head of coal issuing from the bunker above when the dual-acting gate is operated to admit such coal to the conveyor with the attendant danger of rupturing the conveyor trough or damaging the moving conveyor drag parts, a capacity control gate which operates in the manner of a levelling device or strickle plate to spread the coal at a predetermined level below the plane of the top wall of the conveyor trough so that the mass of coal issuing from the gate will pass along the conveyor trough at a safe level and a rate well within the capacity of the conveyor to handle it. The control gate is movable between a retracted elevated position wherein it is out of the path of movement of the coal passing therebeneath and issuing from a preceding station along the conveyor run, to a lowered operative position wherein its levelling action is effective to maintain the coal issuing from the feeding gate at a safe operating level as set forth above. The present invention relates specifically to a novel means for automatically actuating such capacity control gates in timed relation to the movement of the feeding gate in such a manner that the control gate will be moved to its effective or operative position during the initial opening movement of the feeding gate and, conversely, moved to its inoperative out-of-the-way position during the final closing movements of the feeding gate. Since the feeding gate is capable, not only of feeding the underbunker conveyor but also of causing the material issuing from the bunker to by-pass the conveyor when the gate is moved in a direction opposite to its direction of movement when uncovering the conveyor feed opening, the present invention further makes provision for retention of the control gate in its normal inoperative position during such movements of the feeding gate as do not affect initiation or discontinuance of the feeding of coal to the conveyor.

The invention is not limited to use in connection with underbunker conveyor systems and the present control gate actuating mechanism may be found useful, with or without suitable modification, in foundry installations in connection with the movement of sand or gravel; in mining installations for the movement of crushed ore or the like; in bituminous or other mixing plants for the proportionate feeding of pulverized or powdered material; in portable or stationary installations for unloading railway dump cars or the like, and in numerous other installations wherein crushed or ground minerals, grain, flour, prepared foodstuff and other loose comminuted materials commonly handled in bulk are transported by conveyor means from one location to another with provision being made for by-passing or diverting the flow of the materials at some point in the system. Irrespective, however, of the particular use to which the invention may be put, the essential features thereof are at all times preserved.

In carrying out the principles of the present invention, there is contemplated the provision of a novel form of linkage mechanism which operatively connects the dual-acting feeding gate associated with a conveyor and its by-pass channel or path of movement of the material with the capacity control gate associated with the upper run of the conveyor in such a manner that the movements of the former are transmitted to the latter to render the same effective during the first few inches of opening movement of the gate for conveyor feeding purposes and to render the gate ineffective during the last few inches of closing movement of the feeding gate, and also in such a manner that movements of the gate other than those which affect such feeding of the conveyor, will not move the control gate from its normally inoperative or retracted position. This being among the principal objects of the invention, it is a further object to provide a linkage system of this character which is positioned exteriorly of the hopper and conveyor trough so that its operation will not be interfered with by the material undergoing handling and so that it will not become contaminated thereby.

Another object of the invention, in a linkage system of the character briefly outlined above, is to provide a system which will accommodate comparatively wide tolerances or discrepancies in the positioning of the various conveyor and hopper parts to which the linkage mechanism is applied so that the mechanism may, without modification, be applied to conveyor casings and hopper structures whose attachment surfaces extend at various angles from one another.

The provision of a linkage mechanism of this type which is relatively simple in its construction and which may, therefore, be manufactured at a comparatively low cost; one which is comprised of a minimum number of moving parts and which, therefore, is unlikely to get out of order; one which is rugged and durable and which, therefore, will withstand rough usage; one which is readily applicable to existing underbunker conveyor systems, and one which otherwise is well adapted to perform the services required of it, are further desiderata which have been borne in mind in the production and development of the present invention.

With these and other objects in view, which will become more readily apparent as the nature of the invention is better understood, the same consists of the novel construction, combination and arrangement of parts shown in the accompanying two sheets of drawings forming a part of this specification.

In these drawings:

Fig. 1 is a fragmentary perspective view, schematic in its representation of a typical underbunker coal conveyor system to which the present gate control mechanism has been applied;

Fig. 2 is an enlarged sectional view taken substantially centrally through a by-pass feed hopper associated with the underbunker conveyor system of Fig. 1, the section being taken transversely of the direction of conveyor feed;

Fig. 3 is a fragmentary perspective view of the hopper and conveyor structure shown in Fig. 2; and Fig. 4 is a sectional view taken substantially along the line 4—4 of Fig. 2.

Referring now to the drawings in detail and in particular to Fig. 1, a fragmentary portion of an overhead coal bunker has been designated in its entirety at 10 and includes the usual bins 12 which are arranged in a horizontal row and which may be of any desired number, only two such bins being illustrated herein. Disposed beneath the bunker 10 and extending the entire length thereof is an underbunker conveyor assembly 14 of conventional design and including a sheet metal casing 16 (see also Fig. 3) which is generally rectangular in vertical cross section and includes a bottom wall 18, inside and outside side walls 20 and 22 respectively and a top wall 24. The casing 16 is divided by a horizontal partition wall 26 into an upper compartment 28 and a lower compartment 30, the upper run or straightaway portion of the moving conveyor instrumentalities passing along the compartment 28 and the lower or return run thereof passing along the compartment 30.

The conveyor proper includes the usual chain link assemblies 32, the upper run of the conveyor being slidably supported on the partition wall 26 and the lower run of the same being slidably supported on the bottom wall 18. Transverse drag bars or flights 34 extend across the link assemblies 32 in spaced relation and constitute the principal coal-impelling members of the conveyor assembly 14.

Certain of the bins 12 associated with the bunker 10 may be arranged to feed only the conveyor 14, as for example the left hand bin shown in Fig. 1 and alternate bins in the series thereafter. Others of the bins may be adapted to feed the conveyor and also, alternatively, to by-pass the conveyor and feed the material to a boiler installation or other point of fuel consumption of discharge. Accordingly, as shown in Fig. 1, one of the two bins 12 shown therein is operatively connected to the conveyor casing 16 by means of a gravity feed chute 40 for feeding the upper run of the conveyor, this particular discharge means constituting no part of the present invention so that further description thereof is unnecessary. The other bin 12 is shown as being connected through a flared chute 42 to the upper end of an enlarged hopper 44 through which hopper the conveyor assembly including the casing 16 extends as shown in Figs. 1 and 3.

The details of the hopper 44 are best illustrated in Figs. 2 and 3 wherein the hopper is shown as having vertical front and rear walls 46 and 48 respectively, side walls 50 and 52, and a bottom wall 54 which slopes inwardly toward a central discharge opening 56. The hopper 44 is also provided with a top wall 58 having a central rectangular opening 60 formed therein (Figs. 2 and 4), which is bounded by an upstanding continuous flange 62 by means of which the interior of the hopper communicates with the interior of the chute 42 thereabove.

The rectangular opening 60 is adapted to be effectively closed by means of a horizontally reciprocable or slidable feed gate member in the form of a generally rectangular plate 64 having a shallow transversely reciprocable trough-like depression 66 formed in the medial regions thereof as shown in Fig. 4, thus providing lateral side wings or flanges 68 which are tractionally supported on a series of supporting rollers 70 rotatably mounted on pins 72 carried by the hopper casing side walls 52. The gate member 64 is movable from the normally closed position thereof illustrated in Fig. 2 wherein it underlies and effectively closes the opening 60, in opposite directions away from the opening so as to uncover either end of the latter and allow coal to pass downwardly through the opening 60 and into the hopper 44. When the gate 64 moves to the left as viewed in Fig. 2, the coal will pass through the opening 60 and downwardly through the hopper casing and be discharged from the latter through the lower opening 56 for subsequent conduction to a weight scale prior to introduction to a stoker or the like. When the gate moves to the right as viewed in this figure, the coal will pass through the opening 60 and enter the conveyor casing 16 for lateral passage along the upper run of the conveyor and away from the hopper. Accordingly, the top wall 24 of the conveyor casing is formed with an opening 74 therein (Fig. 4) in communication with a chute 76, the upper open rim of which underlies the left hand edge of the opening 60 and also underlies the left hand end of the gate 64 when the latter is in its extreme right hand open position. Thus, when the gate is moved to its extreme right hand open position, coal will pass by gravity through the openings 60 and 74 and be deposited in the conveyor on the upper run thereof.

Movement of the gate 64 between its normally closed position and either of its open positions is effected under the control of a hand wheel 80 (Fig. 4) mounted exteriorly of the hopper casing on a transverse shaft 82 rotatably journalled in bearing plates 84 on the casing side walls 50. The shaft 82 carries a pair of spaced pinions 86 thereon in the medial regions thereof which mesh with toothed racks 88 mounted on the underneath side of the gate member 64. A sliding gate 89 mounted on rollers 91 serves normally to close an opening 93 provided in the bottom wall 18 of the conveyor casing 16 within the hopper 44 so that upon opening thereof the contents of the lower run of the conveyor may be discharged into the hopper. The gate 89 represents an incidental disclosure in no way connected with the present invention.

Referring now to Figs. 3 and 4, immediately behind each of the hoppers 44 in the underbunker conveyor system in the direction of travel of the upper run of the conveyor, the conveyor casing 16 is provided with a closed hood portion 90 within which there is disposed a capacity control gate assembly such as has been designated in its entirety at 92, the gate assembly operating in the manner of a metering strickle or levelling device to prevent piling up of the coal within the conveyor casing 16 and thus clogging the same with the attendant danger of rupturing the casing or damaging the operative moving parts of the conveyor assembly 14.

The control gate assembly 92 includes an oscillatory gate proper 100 which is in the form of a transversely extending strickle plate of L-shape cross sectional configuration and having a flange 102 adapted to extend vertically when the gate is in its operative position and an attachment flange 104 at right angles thereto and overlying a transverse rock shaft 106 which extends across the hood portion 90 between the side walls thereof and which is rotatably journalled in these walls for limited rocking movement about a horizontal axis. Attachment bolts 108 extend through the flange 104 and shaft 106 and serve to firmly clamp the gate member 100 to the shaft so that the latter will turn bodily therewith. The effective height of the gate member 100 may be varied by means of an adjustable extension plate 110 secured to the flange 102 by pin and slot connections 112. The rock shaft 106 projects outwardly through the outer side wall of the hood portion 90 and carries thereon a gate-actuating lever 114 by means of which the gate assembly may be operated and the gate member moved between its retracted full line position as shown in Fig. 4 and its dotted line operative position wherein the flange 102 extends vertically.

In the retracted elevated position of the control gate 92, the free edge of the extension plate 110 remains above the level of the upper or top wall 24 of the conveyor casing 16 so that the normal flow of material along the conveyor in the upper run thereof is unobstructed. In the lowered operative position wherein the flange 102 and its extension 110 extend vertically downwardly into the trough portion of the conveyor casing, the lowermost edge of the extension plate 110 serves to control the level of the stream of coal which may pass beneath the gate.

The arrangement of parts thus far described is purely exemplary of a selected environment for the present invention which consists in a novel means for automatically actuating the capacity control gate mechanism 92 to open the same automatically in timed relation to the movements of the feed gate 64 as the latter is operated under the control of the hand wheel 80 to admit material to the conveyor casing 16 through the chute 76 within the hopper 44.

According to the present invention, the rack 88 which is disposed adjacent the side wall 50 of the hopper 44 has welded thereto a depending actuating finger 120, the free end of which is generally rounded in order that the finger may better perform its camming action as will be described presently. The finger 120 is designed for cooperation with a train 122 of linkage elements which constitutes the novel linkage mechanism of the present invention and which serves to operatively connect the feed gate 64 and the control gate assembly 92 so that the latter may follow the movements of the former according to a predetermined manner.

The linkage train or mechanism 122 extends vertically upwardly and forwardly from one free end of the lever 114 and includes a first bell crank lever assembly 124 (Fig. 3), a second bell crank lever assembly 126, an intermediate connecting link 128 and a link 129 extending between the bell crank lever assembly 126 and the operating lever 114. The first bell crank lever assembly 124 is designed for cooperation with the cam finger 120 during initial movements of the feed gate 64 in either direction tending to uncover the feed opening 60 at either end thereof, although such cooperation is effective to lower the control gate 92 only during admission of coal to the conveyor casing 16, as well as during the final closing movements of the gate 64 when the same moves to its medial positon underlying the opening 60.

As best seen in Figs. 2 and 3, the first bell crank lever assembly 124 includes a generally triangular plate 130 which, in effect, constitutes one lever arm of the bell crank, a depending arm 132 which constitutes the other lever arm of the bell crank, and an intermediate connecting pivot shaft 134 which is rotatably mounted for rocking movement in the side wall 50 and in a bracket 136 (Fig. 4) which is bolted as at 138 to the side wall 50. The free end of the arm 132 is operatively connected to one end of the link 128. The plate 130 has one corner thereof secured to the pivot shaft and each of the two other corners thereof is provided with a laterally facing pin, the two pins being designated at 140 and 142 respectively, and being positioned on opposite sides of the vertical plane of the pivot shaft 134. As will be described subsequently, the two pins 140 and 142 are adapted to straddle the actuating finger 120 on the rack 88 when the feed gate 64 is in its fully closed position.

The bell crank lever assembly 122 includes a sleeve 144 which is rotatably mounted on a stud 146 secured at its inner end on the bracket 136 (Fig. 4) and maintained in position thereon by a cotter pin 148 or the like. The sleeve 144 carries at one end thereof an arm 150 which constitutes one lever arm of the bell crank and which is operatively connected at its free end to an end of the link 128. The sleeve 144 carries at its other end an arm 152 which constitutes the other lever arm of the bell crank, this latter arm being operatively connected to an end of the link 129. The link 129 is in the form of a relatively loose eyelet type connector and, by virtue of such a conection, limited angular displacement between the linkage mechanism as a whole and the operating lever 114 may be accommodated, as for example, when installations are involved where the conveyor casing does not extend truly normal to the plane of the hopper side wall on which the linkage mechanism, in the main, is supported. An adjustable counterweight 154 is slidably mounted on the rear end of the operating lever 114 and is designed for cooperation with a series or row of notches 156 for selective placement of the counterweight along the lever to counterbalance any unbalanced gravitational forces acting on the lever and its associated gate structure 92.

As previously stated, the herein described linkage mechanism operates to lower the control gate strickle plate 100 only when the feed gate 64 is operated to feed coal to the conveyor 14. The control gate is not operated when the feed gate moves to its open position to by-pass coal around the conveyor for discharge through the hopper opening 56. Accordingly, when the gate plate 64 moves to the right as viewed in Fig. 2 from its fully closed position beneath the opening 60 under the influence of the hand wheel 80, the depending cam finger 120 will, immediately upon initial movement of the gate, engage the laterally extending pin 142 provided on the generally triangular plate 130 and, by a camming action, cause the plate to be swung about the pivotal axis of the pivot shaft 134 in a clockwise direction thus lowering the elevation of the pin 142 and raising the elevation of the pin 140. Such movement of the plate 130 will rock the pivot shaft 134 and cause the lower arm 132 of the bell crank lever assembly 124 to be swung in a clockwise direction so as to shift the link 128 to the left as seen in this view and thereby cause the bell crank lever assembly 126, including the arms 150 and 152, to be swung in a counterclockwise direction so that the free end of the arm 152 will be elevated in such a manner as to move the link 129 downwardly and lower the free end of the operating lever 114. Lowering of the free end of the lever 114 serves to swing the control gate strickle plate 100 in a clockwise direction and lower the same into the path of movement of the coal issuing from the feed gate opening 60 so that the same will not pile up within the hood structure 40. Continued opening movements of the gate plate 64 will cause the depending finger 120 to trip (so to speak) over the upper side of the pin 142 and move in a horizontal plane to a region remote from the pin, thus leaving the control gate assembly 92 in the operative position which it assumes during the first few inches of feed gate travel.

Upon closing of the feed gate 64 under the control of the hand wheel 80, movement of the gate to the right as viewed in Fig. 2 will not affect the control gate structure until such time as the finger 120 again passes over the pin 142 and comes into contact with the elevated pin 140. At this time the plate 130 will be swung in a counter-clockwise direction so as to reverse the direction of movement of the various linkage mechanism instrumentalities and thus cause the strickle plate 100 to be swung in a counterclockwise direction and thus elevated out of the path of movement of coal passing along the upper run of the conveyor and which may be derived from a previous deposition of material in the conveyor at a region in advance of the hopper 44.

When the feed gate 64 is moved in a direction to open the feed opening 60 directly into the hopper 44 for discharge thereby through the opening 56, i. e., when the gate is moved to the left as viewed in Fig. 2, the finger 120 will initially engage the pin 140 and swing the triangular plate 130 in a counterclockwise direction thus lowering the pin 140 and elevating the pin 142. Such movement of the plate will transmit clockwise motion to the lower bell crank assembly 126 through the medium of the link 128 so that the link 129 will be elevated and cause counterclockwise movement of the operating lever and its associated strickle plate 100. This latter plate, being already elevated to an inoperative position within the hood 40, will thus be further elevated without function insofar as movement of the coal through the conveyor casing 16 in the vicinity of the mechanism 92 is concerned. Continued movement of the gate 64 to the left will cause the finger 120 to move horizontally away from the pin 140 to a remote region. Upon return or closing movement of the gate 64 by movement to the right, the finger 120 will engage the pin 142 as the gate approaches its closed position beneath the feed opening 60 and restore the plate 130 to its normal position and operate the linkage mechanism to restore the control gate structure to its normal inoperative position as shown in dotted lines in Fig. 4.

It should be observed that, due to the specific nature of the linkage mechanism 122, the control gate will be moved from its elevated inoperative position to its lowered advanced operative position during the first few inches of travel of the feed gate 64 to the left as viewed in Fig. 2. Conversely, the control gate will be moved from its operative lowered position to its inoperative elevated position during the last few inches of closing travel of the feed gate as the same moves to the right. By such an arrangement, there is no opportunity for the conveyor casing to become flooded before the capacity control gate is effective.

It is to be further noted that inasmuch as the eyelet type of link 129 is capable of limited turning movement about its own longitudinal axis and relative to the ends of the lever arms to which it is connected, the linkage mechanism as a whole is readily applicable without modification to feed and control gate assemblies which assume different angular positions relative to each other and wherein the reciprocable feed gate may travel in a linear path which is not necessarily parallel to the axis of turning movement of the control gate.

In compliance with Title 35, U. S. Code, Section 22, a preferred embodiment of the invention has been shown in the accompanying drawings and described herein, but it should be understood that the invention is not to be limited to the exact arrangement of parts disclosed and that various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In an apparatus for handling loose comminuted or other materials commonly handled in bulk, in combination, a bin having a bottom wall provided with an elongated opening therein for the discharge by gravity of the material therethrough, a horizontally reciprocable feed gate selectively movable in opposite directions between an intermediate central closed position wherein it completely closes said opening and two laterally displaced open positions wherein different regions of the opening are uncovered for selective feeding of the material through the opening at horizontally displaced regions therealong, a conveyor extending beneath said opening and having a trough-like bottom, side walls and an open top in vertical register with one of said displaced regions, a conveyor proper having an upper run supported on said trough bottom and movable therealong in one direction for conveying the material discharged from said opening at said latter displaced region along the casing, a capacity control gate including a strickle plate pivoted within the casing in the path of movement of the material discharged into the casing through said opening, said plate being capable of swinging movement about a horizontal axis between a lowered operative position wherein it limits the flow of material therebeneath and an elevated position wherein it is out of the path of movement of the material passing along the casing, a bellcrank lever positioned exteriorly of the casing for swinging movement about a fixed horizontal axis normal to the direction of reciprocating movement of the feed gate and having a pair of spaced actuating pins mounted on one arm thereof on opposite sides of a vertical plane passing through said axis, a cam finger mounted on said feed gate and movable bodily therewith, said finger normally being disposed between said actuating pins when the feed gate is in its closed position with one of said pins being disposed in the path of movement of the finger when the feed gate moves in one direction of opening movement and with the other pin being disposed in the path of movement of the finger when the feed gate moves in the other direction of opening movement, a second bell crank lever mounted for swinging movement about a fixed axis normal to the direction of movement of said feed gate, a link connecting the other arm of said first mentioned bell crank lever to one arm of the second bell crank lever, and a link connecting the other arm of said second bell crank lever to said operating lever.

2. In an apparatus for handling loose comminuted or other materials commonly handled in bulk, the combination set forth in claim 1 wherein said last mentioned link is of the eyelet type having its ends loosely connected to the operating lever.

3. In an apparatus for handling loose comminuted or other materials commonly handled in bulk, in combination, a bin having a bottom wall provided with an elongated opening therein for the discharge by gravity of the material therethrough, a horizontally reciprocable feed gate selectively movable in opposite directions between an intermediate central closed position wherein it completely closes said opening and two laterally displaced open positions wherein different regions of the opening are uncovered for selective feeding of the material through the opening at horizontally displaced regions therealong, a conveyor extending beneath said opening and having a trough-like bottom, side walls and an open top in vertical register with one of said displaced regions, a conveyor proper having an upper run supported on said trough bottom and movable therealong in one direction for conveying the material discharged from said opening at said latter displaced region along the casing, a capacity control gate including a strickle plate pivoted within the casing in the path of movement of the material discharged into the casing through said opening, said plate being capable of swinging movement about a horizontal axis between a lowered operative position wherein it limits the flow of material therebeneath and an elevated position wherein it is out of the path of movement of the material passing along the casing, a depending cam finger mounted on said feed gate and movable bodily therewith, a bell crank lever mounted for swinging movement about a fixed horizontal axis normal to the direction of reciprocation of the feed gate, an actuating pin mounted on one arm of said bell crank lever and positioned in the path of horizontal movement of the cam finger during the initial opening movement of the feed gate in a direction to uncover said latter displaced region of the feed opening, a second bell crank lever mounted for swinging movement about a fixed axis normal to the direction of movement of the feed gate, a link connecting the other arm of said first bell crank lever to one arm of the second bell crank lever, and means including a link operatively connecting the other arm of the second bell crank lever and said strickle plate.

4. In an apparatus for handling loose comminuted or other materials commonly handled in bulk, the combination set forth in claim 3 including, additionally, a catch pin mounted on said one arm of the first bell crank lever and spaced from the actuating pin, said catch finger being normally positioned in the path of return closing movement of the feed gate.

5. In an apparatus for handling loose comminuted or other materials commonly handled in bulk, in combination, a bin having a bottom wall provided with an elongated opening therein for the discharge by gravity of the material therethrough, a horizontally reciprocable feed gate selectively movable in opposite directions between an intermediate central closed position wherein it completely closes said opening and two laterally displaced open positions wherein different regions of the opening are uncovered for selective feeding of the material through the opening at horizontally displaced regions therealong, a conveyor extending beneath said opening and having a trough-like bottom, side walls and an open top in vertical register with one of said displaced regions, a conveyor proper having an upper run supported on said trough bottom and movable therealong in one direction for conveying the material discharged from said opening at said latter displaced region along the casing, a capacity control gate including a strickle plate pivoted within the casing in the path of movement of the material discharged into the casing through said opening, said plate being capable of swinging movement about a horizontal axis between a lowered operative position wherein it limits the flow of material therebeneath and an elevated position wherein it is out of the path of movement of the material passing along the casing, an operating lever positioned exteriorly of the casing and operatively connected to the strickle plate for swinging movement in unison therewith, a bell crank lever mounted for swinging movement about a fixed horizontal axis normal to the direction of reciprocating movement of the feed gate, a cam finger mounted on said feed gate and movable bodily therewith, a pair of spaced abutments on one arm of said bell crank lever and normally straddling the cam finger when the feed gate is in its closed position, said abutments being positioned on opposite sides of the vertical plane passing through said fixed axis whereby horizontal travel of the feed gate in one direction away from its closed position will cause the finger to engage one abutment and lower the elevation thereof so that the finger may trip over said abutment and move away therefrom and to elevate the other abutment, and whereby horizontal travel of the feed gate in the other direction away from its closed position will cause the finger to engage the other abutment and lower the elevation thereof so that the finger may trip over said latter abutment and move away therefrom and to elevate said one abutment, a second bell crank lever mounted for swinging movement about a fixed axis parallel to said first mentioned axis, a link connecting the other arm of said first mentioned bell crank lever to one arm of the second bell crank lever, and a link connecting the other arm of said second bell crank lever to said operating lever.

References Cited in the file of this patent

UNITED STATES PATENTS 2,389,566    Thomas _____ Nov. 20, 1945

FOREIGN PATENTS 319,219    Germany _____ Feb. 28, 1920